United States Patent [19]

Krutz et al.

[11] Patent Number: 4,679,488

[45] Date of Patent: Jul. 14, 1987

[54] INTEGRAL ROTATIONAL DISPLACEMENT SENSOR FOR AN HYDRAULIC MOTOR

[76] Inventors: Gary Krutz, 605 Northridge Dr., West Lafayette, Ind. 47906; David L. Hansen, 909 E. 24th St., Apt. C, Hutchinson, Kans. 67502

[21] Appl. No.: 805,119

[22] Filed: Dec. 4, 1985

[51] Int. Cl.⁴ ............................................ F01B 31/12
[52] U.S. Cl. ........................................ 91/1; 73/502; 418/2; 418/61 B
[58] Field of Search ............... 73/116, 502; 91/1; 418/2, 61 B

[56] References Cited

U.S. PATENT DOCUMENTS 3,667,290  6/1972  Hohn ............................. 73/116 X
4,051,351  9/1977  Mallick, Jr. et al. ................ 91/1
4,593,555  6/1986  Krutz et al. ...................... 73/502

*Primary Examiner*—Stephen F. Husar
*Attorney, Agent, or Firm*—Emrich & Dithmar

[57] ABSTRACT

An integral sensor for an hydraulic motor measures speed, torque and rotation displacement produced by the motor by combining pressures produced in pressure chambers of the hydraulic motor as the rotor rotates enabling a pressure sensor to provide a pressure signal defined by at least three states which permits incremental movement of the rotor to be determined. Zero positioning determined by coupling pressure through the rotor to create a unique occurrence reflected in the pressure signal once per revolution.

22 Claims, 17 Drawing Figures

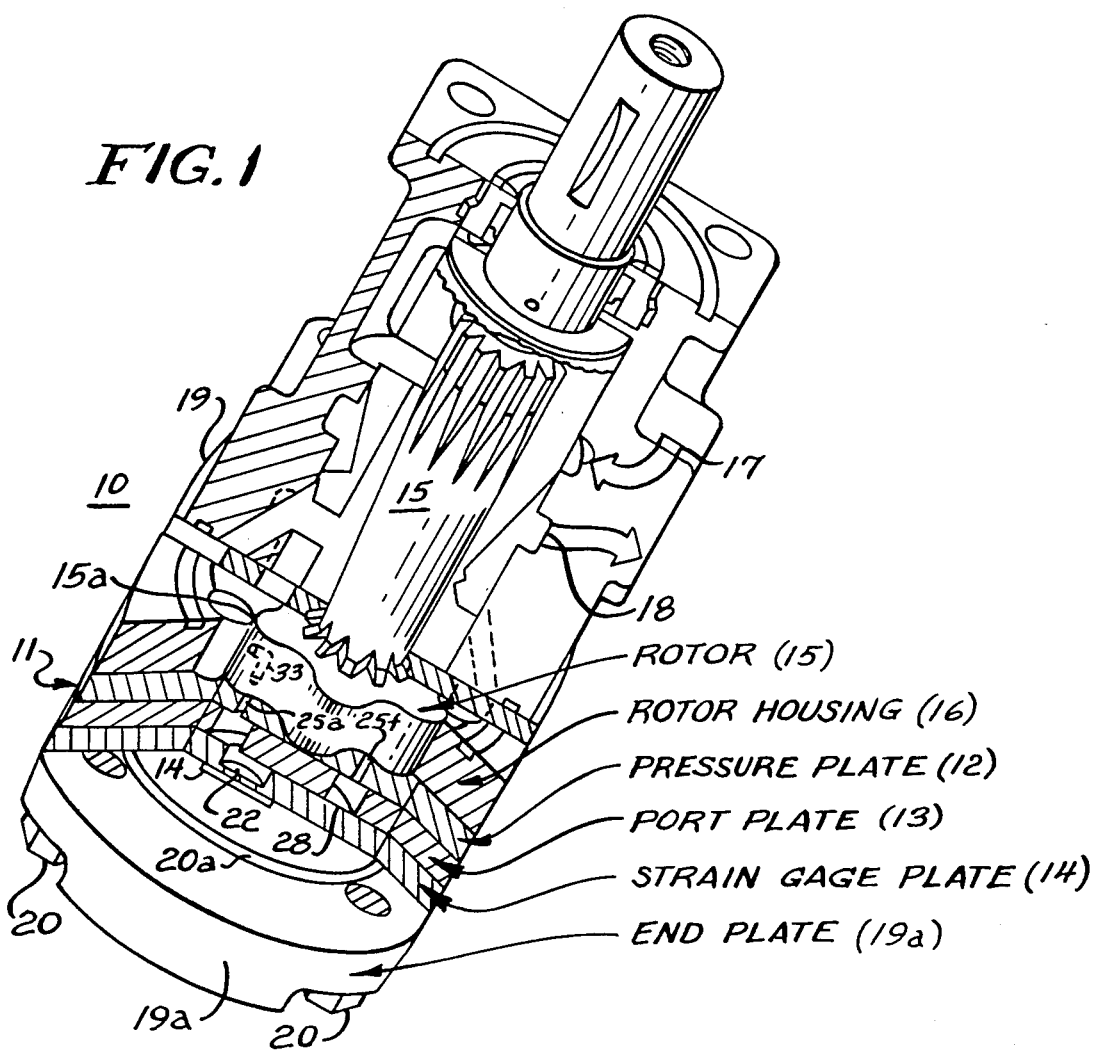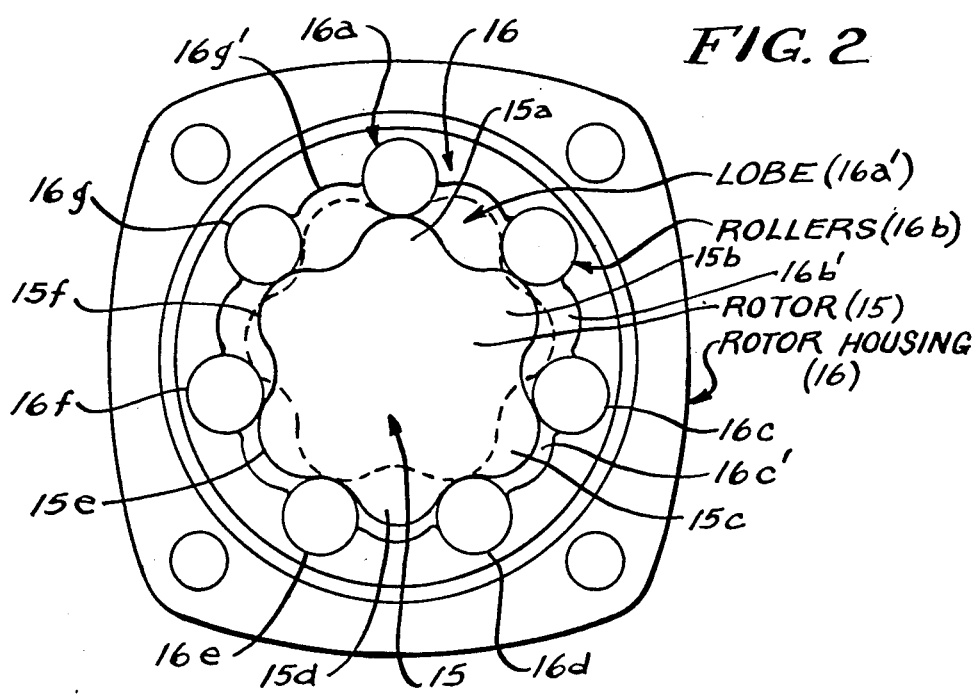

INTEGRAL ROTATIONAL DISPLACEMENT SENSOR FOR AN HYDRAULIC MOTOR

BACKGROUND OF THE INVENTION

This invention relates to hydraulic systems, and in particular to a sensor for incorporation into a hydraulic motor for measuring rotational displacement of the motor shaft.

The agriculture industry has traditionally been one of the leading users of hydraulic systems. The abilities of hydraulic components to produce high amounts of power in a small space and to reach remote applications are two of the major advantages of hydraulic systems for the use in industrial and agricultural applications. Hydraulic actuators can be placed in locations remote to the power source and thus are commonly used on farm implements and in industrial plants. Hydraulic components can be controlled within a certain degree of precision by an operator or by hydraulic feedback through the system.

With the development of the microprocessor and the microcontroller, a new dimension of feedback control has resulted. The high speed microcontroller can process thousands of pieces of data per second with extreme precision, limited only by the components used in the electronic circuit. The major drawback in the use of electronic control has been the limitations imposed by the interfacing units used to provide the microcontroller with needed information about the process. The traditional interfacing units in hydraulic systems have been the pressure transducer, flow meter, tachometer, numerous linear position sensing devices, and various other transducers. Although many of these transducers provide high accuracy, most suffer from high cost. For example, the pressure transducer requires its own electronic circuitry which increases the cost and is also packaged for use in a variety of applications which in turn limits its use in any single situation.

The number of types of transducers used in the past has been limited, which has created interest in the area of sensor development. Sensors are being developed for a specific task, such as sensing implement draft using strain gages on a link of an agricultural tractor's three point hitch. There is a need to develop sensors which can be used for a specific purpose and provide information on multiple variables using a single signal. One such need is for a sensor which can produce information about the rotational displacement of a hydraulic motor. In order for this type of sensor to be useful in agricultural and industrial situations, it must have low cost, be sufficiently accurate, and be able to withstand the environments in which hydraulic motors are used.

Control of mass flow rate on a conveyor is one example of the potential use of this type of rotational displacement sensor. If the flow of material exiting a conveyer is to be periodically interrupted, then the amount coming off the conveyer is dependent on how far the driving motor has turned. In this situation, a low cost sensor with sufficient accuracy is very desirable.

An example of a future application might be the rotational control of agricultural robots via motor sensors. Many types of agricultural robots are going to be developed in the future. Some of these, such as robots used for spraying, will require a low cost sensor which has sufficient accuracy and which is inherently shielded from the weather, temperature, and abuse associated with agricultural uses.

Past uses of transducers have been to instantaneously measure a specific variable, such as torque. Many additional applications are possible for transducers which can produce a signal or signals corresponding to a variety of variables. A transducer to sense two of the other variables needed to be measured in a hydraulic motor, speed and torque is disclosed in the U.S. patent application Ser. No. 562,436 of Gary Krutz and Mark Evans, now U.S. Pat. No. 4,593,555. The transducer comprised a full bridge strain gage network which was used to sense pressure inside the motor. The speed was determined by the frequency of the square wave output divided by the number of pressure waves per revolution. New applications could be developed if a transducer was capable of measuring rotational displacement as well as speed and torque.

SUMMARY OF THE INVENTION

It is an object of the present invention to provide an improved integral sensor for an hydraulic motor which measures speed, torque and rotational displacement being produced by the motor.

Another object of the invention is to provide an absolute shaft encoder for use on low speed high torque motors.

Another object of the invention is to provide a sensor for an hydraulic motor which permits measurement of torque for partial increments of rotation of the motor shaft.

These and other objects are achieved by the present invention which has provided a sensor for a fluid motor, the sensor including pressure sensing means, and pressure coupling means interposed between the pressure sensing means and the rotor of the motor, the pressure coupling means including a plurality of apertures to selectively communicate variations in pressure to the sensor as the rotor is rotated. The pressure coupling means includes at least first and second apertures whereby a pressure signal produced by the sensing means is defined by at least three states permitting at least incremental movement of the rotor to be determined from the sensor signal.

In accordance with the invention, the pressure coupling means comprises a further aperture there through communicating with a passageway formed in the rotor and coupling pressure from an edge of the rotor to the sensing means whereby the sensor signal defines a reference point for the rotor shaft, enabling determination of a zero position crossing for each revolution of the rotor.

Further in accordance with the invention, there is provided a feedback control system for controlling a motor. The control system includes the rotational displacement sensor for determining incremental changes in rotation of the motor rotor relative to a zero position and calculates speed and torque of the motor in generating control signals for application to the motor.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a perspective view, partially in section, of an hydraulic motor including a rotational displacement sensor provided by the present invention;

FIG. 2 is an end view illustrating the rotor and rotor housing of the motor shown in FIG. 1 with the sensor removed;

DESCRIPTION OF A PREFERRED EMBODIMENT

Figure 5:
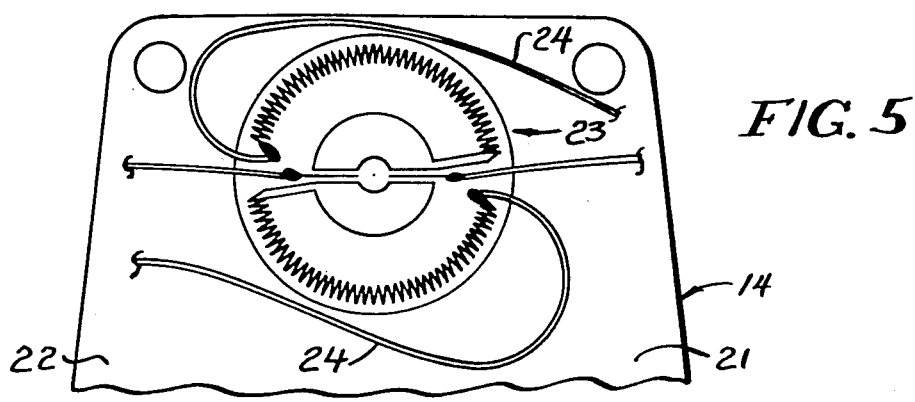
FIG. 5 is a fragmentary top elevation view of a sensor plate of the displacement sensor.
Figure 6:
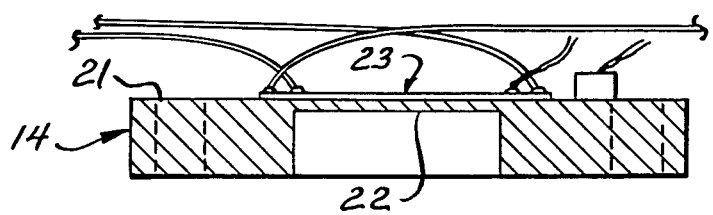
FIG. 6 is a side sectional view of the sensor plate of the rotational sensor.

Referring to FIGS. 1 and 2, the rotational displacement sensor provided by the present invention is incorporated into an hydraulic motor 10. The sensor indicated generally at 11 includes a pressure plate 12, a port plate 13 and a strain gage plate 14. The pressure plate 12 is shown in detail in FIG. 3. The port plate 13 is shown in detail in FIG. 4. The strain gage plate 14 is shown in detail in FIGS. 5–6.

Figure 7:
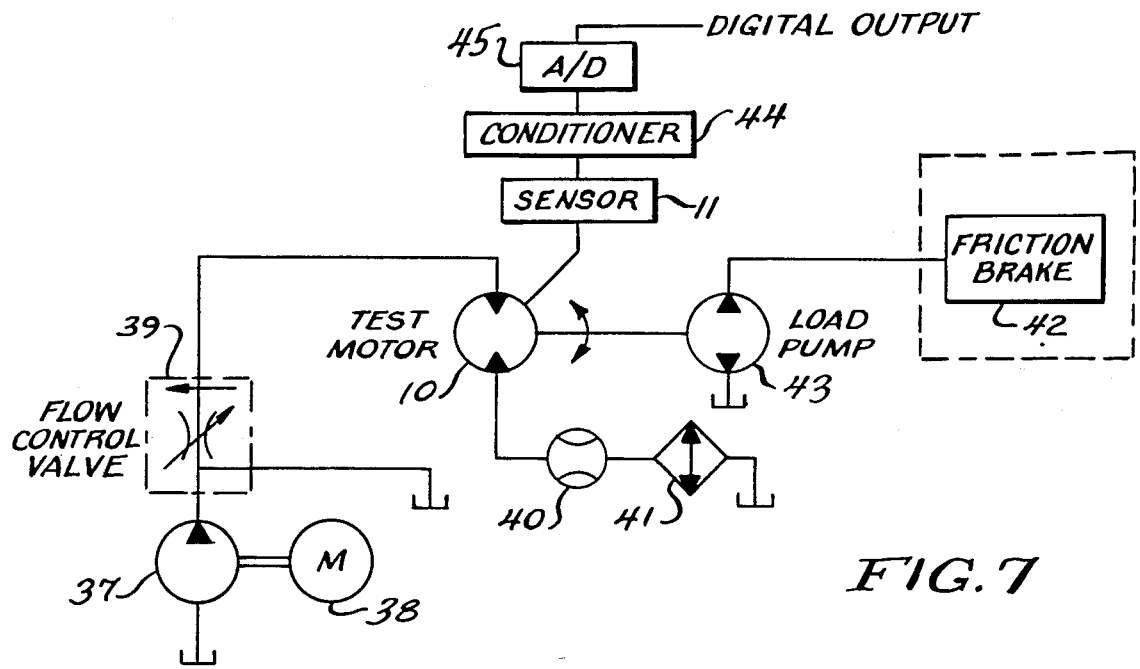
FIG. 7 is a schematic of the hydraulic circuit employed for testing the displacement sensor.

The sensor 11 is incorporated into a RS-GE-1 White Hydraulics Roller Stator motor. The White Hydraulics motor is a gerotor type motor using an inner rotor 15 having six lobes 15a–15f and an outer housing 16 having seven rollers 16a–16g. The lobes 15a–15f are constantly in contact with the rollers 16a–16g. The dotted line in FIG. 2 shows the rotor 15 after a 30 degree rotation. The displacement of the motor is 164 cm³/rev. Oil is supplied to and from the rotor 15 through respective ports 17 and 18 in the same side of the motor housing 19. A 6.7 kW hydraulic pump 37 (FIG. 7) supplied oil to the motor. The pump ran at a constant flow rate of 45 liters per minute, while the flow to the motor 10 was varied from 0 to 45 liters per minute using a priority flow regulator 39 (FIG. 7). The load for the test motor was provided by a friction brake 42 (FIG. 7).

The rotor 15 and rotor housing 16 define seven pressure chambers 16a'–16g'. The three plates 12–14 are sandwiched between the rotor assembly and the end plate 19a of the motor housing 17 and held in place by bolts 20 which hold the end plate 19a in place. An O-ring 20a provides a fluid seal between the end plate 19 and the strain gage plate 14. In the arrangement disclosed in the Krutz et al application Ser. No. 562,436, now U.S. Pat. No. 4,593,555, a pressure sensor was located next to one of the chambers and received six pressure pulses for each revolution of the shaft. In accordance with the present invention, increased resolution of the displacement signal is provided by communicating each of the seven chambers two at a time to the pressure sensor in a manner to be described. The resultant output signal can be correlated to torque and speed as well as to rotational displacement.

Sensor

Considering the sensor 11 in more detail, reference is made to FIGS. 3, 4, and 5–6, which illustrate, respectively the pressure plate 12, port plate 13 and strain gage plate 14 provided in accordance with one embodiment of the invention. The strain gage plate 14 includes a pressing sensor which is generally similar to that shown in the referenced Krutz et al application. The strain gage plate 14 comprises a plate member 21 which is 6.35 mm (0.25 in.) thick into which is machined a diaphragm 22 which is 12.70 mm (0.5 in.) in diameter by 1.52 mm (0.06 in.) thick. An 11.18 mm (0.44 in.) diameter full bridge diaphragm strain gage 23, such as the type BLH No. & FAES4-44-12S6, 120 ohm strain gage is bonded to the plate 21 over the diaphragm 22 using Eastman 910 adhesive. Conductors 24 are provided to connect the output of the sensor to signal detecting apparatus. The end plate 19a of the motor housing 19 (FIG. 1) may be countersunk to provide clearance for the strain gage sensor and its associated conductors.

Figure 3:
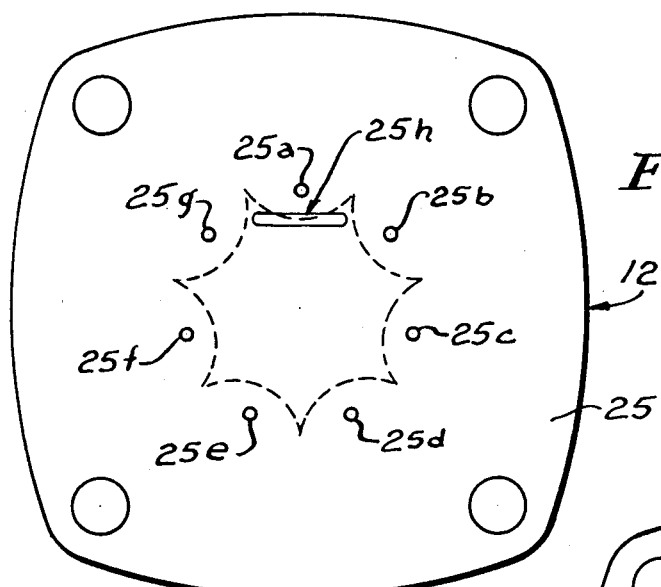
FIG. 3 is a plan view of a pressure plate of the displacement sensor.

Referring to FIG. 3, the pressure plate 12 includes plate member 25 which is similar in shape to the strain gage plate 14 (FIG. 5) and includes seven port holes 25a–25g drilled in the plate on a 37.69 mm diameter circle to locate the holes in overlying relationship with chambers 16a'–16g'. For motors having a larger or smaller diameter rotor and rotor housing, the placement of the port holes would be on a correspondingly larger or smaller diameter. The holes 25a–25g are spaced 51.43 degrees apart and are 0.40 mm in diameter. Each of the seven port holes 25a–25g is located over different chambers 16a'–16g' defined by the rotor 15 and rotor housing 16. These seven holes port pressure to the sensor enabling the sensor to operate as an incremental displacement sensor providing information about how far the shaft has rotated. For the purpose of defining a zero position or reference, a further hole 25h is drilled in the pressure plate 12 radially inwardly of one of the holes, such as hole 25a. An elongated recess or groove 25h' may be provided to reduce tolerance in the positioning of the zero position hole 25h. As will be described, the zero reference hole 25h cooperates with a passageway formed in the rotor 15 to modify the sensor output signal, uniquely once per revolution of the rotor indicating a reference position.

Figure 4:
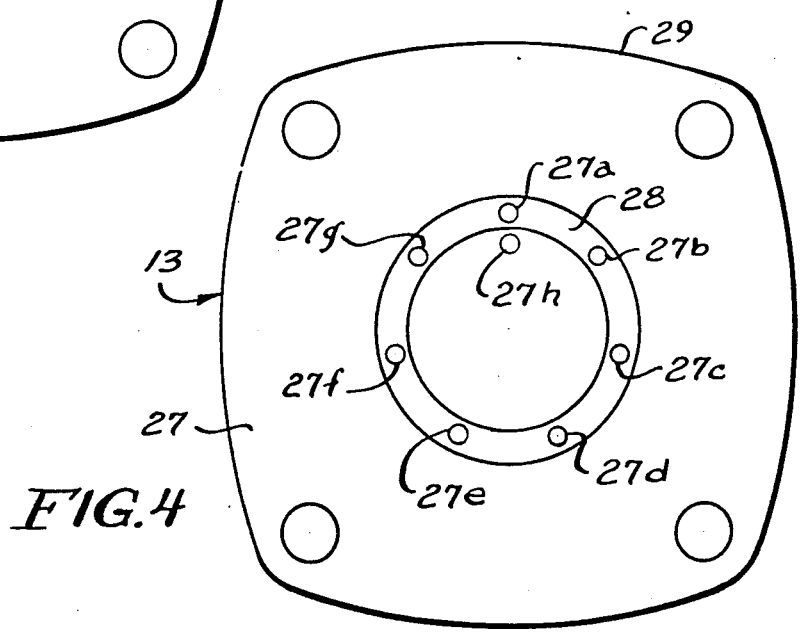
FIG. 4 is a plan view of the port plate of the displacement sensor.

Referring now to FIG. 4, the port plate 13 acts as a manifold to communicate the seven port holes 25a-25g in the pressure plate to the cavity of the sensor, and to communicate the zero position hole 25h to the sensor, or to a separate sensor which may also be formed on the strain gage plate 14. That is, a single sensor can be used to detect both incremental and zero position pressure pulses, or two separate sensors can be employed.

The port plate 13 includes a plate member 27 which is substantially identical in shape to the pressure plate. However, the holes 27a-27h formed through the port plate 13, which in use are aligned with the holes 25a-25h in the pressure plate 12 (FIG. 3), are larger than the holes in the pressure plate. Also, an annular groove 28 is formed in the surface 29 of the port plate which is adjacent to the strain gage plate 14 (FIG. 1). The port plate 13 communicates the pressure and zero position holes 25a-25h in the pressure plate 12 (FIG. 1) with the sensor cavity (or cavities) in the strain gage plate 14 as shown in FIG. 1.

Multiporting Arrangement

Digressing, to increase the resolution of the displacement signal, a multiporting arrangement is provided by which oil from all lobes on the rotor is ported to a single strain gage. The signal which the strain gage produces is then influenced by all six lobes instead of just one, as in the method disclosed by Krutz et al in the referenced patent application.

For purposes of simplification of the following discussion, it is assumed that only two lobes are ported to the sensor 11. Each of the two lobes can be at one of two states at any given time. A lobe can either be at a high pressure state or at a low pressure state. Since both lobes contributed to the output signal, the state of each lobe can be determined to predict the form of the output signal. When both lobes are at a high pressure state, the output is at a high pressure state (high voltage). Also, when both lobes are at a low pressure state, the output is at a low pressure state (low voltage). When one lobe is at a high pressure state and the other lobe is at a low pressure state, the output is an intermediate state.

Figure 8:
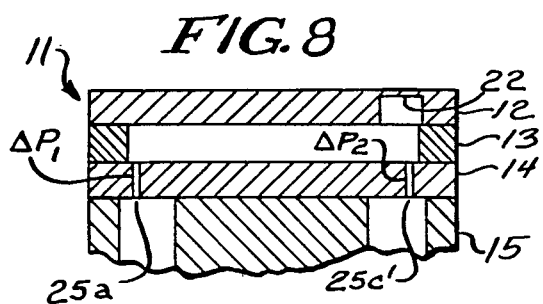
FIG. 8 is a simplified side sectional view of the displacement sensor plates assembled on the rotor set of the hydraulic motor.

FIG. 8 is a representation of the sensor 11, assuming one lobe at high pressure and the other lobe at low pressure. Under these circumstances, oil flow is induced from the high pressure lobe to the low pressure lobe. As a result of the induced oil flow, two pressure drops occur, $\Delta P_1$ and $\Delta P_2$. The magnitudes of the presure drops depend upon the flow through the orifices, and the cross-sectional area of the orifices. Since the flow through the orifices must be the same, neglecting leakages between the plates and oil compression, the only controllable variable is the orifice area. The areas of the two orifices are made equal, which causes the pressure drops, $\Delta P_1$ and $\Delta P_2$, to be equal. Therefore, the pressure sensed by the diaphragm is a pressure half way between the high and low pressure states. The half way between state was called the intermediate or middle pressure state. For a hole diameter of 0.40 mm, the flow through the orifice was 7.0 cm³/rev. The signal was at the intermediate state, one lobe at high pressure and one at low pressure, for one half of the angular displacement time of the rotor.

Figure 9:
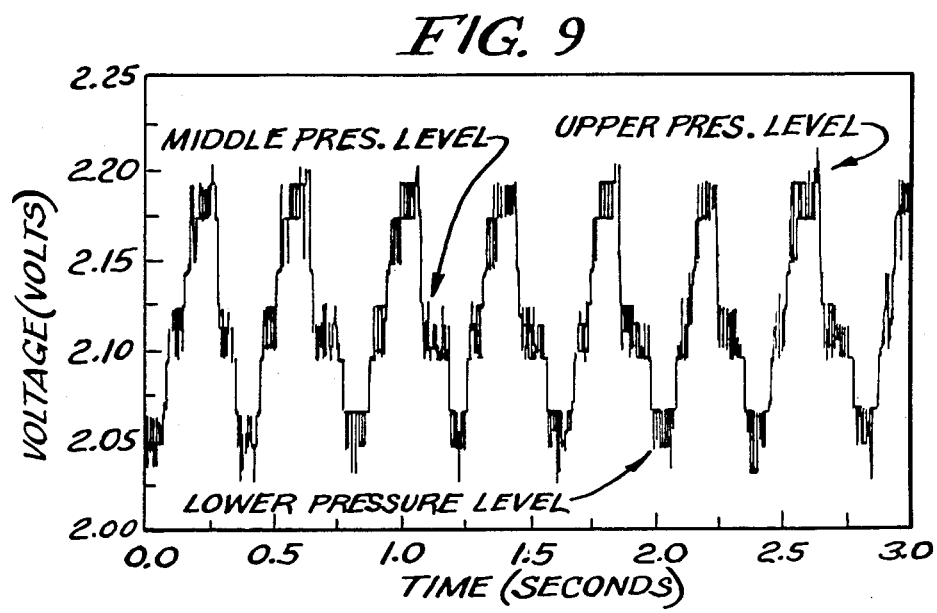
FIG. 9 is a graph of pressure pulses detected by a sensor having a two hole pressure plate.

This method of obtaining a three state signal from a two state motor was tested using a pressure plate having two 0.79 mm holes, one located 102.9 degrees from the first which was at the designated zero degree location. The 102.9 degree hole spacing was used to produce a signal which was a combination of lobes one and three on the rotor housing. The two holes were then communicated by a porting plate and also communicated to a sensor, such as sensor 11. The signal output obtained is shown in FIG. 9. Three distinct levels are produced and are indicated in FIG. 9 as upper pressure level, intermediate pressure level and lower pressure level.

The offset of the rising edge of the first lobe to the rising edge of the second lobe, in a White Hydraulic motor, can be calculated a follows:

$$\left| \frac{360°}{6 \text{ (lobes)}} - \frac{360°}{7 \text{ (rollers)}} \right| \times 2 \text{ (ports)} = 17.1°$$

This is also the offset of the rising edge between the lower state and the intermediate state. The intermediate state is sensed until both lobes go to high pressure state. The high pressure state continues until the first lobe goes from a high pressure state to a low pressure state. This produces another intermediate state because the second lobe is still at a high pressure state. The intermediate state continues until the second lobe goes from high to low pressure state. The resulting output signal has a change of state of not more than 17.1 degrees for the exemplary two-hole pressure plate.

In the actual embodiment where the pressure plate has seven port holes, the sensor 11 measures pressure in all seven lobes at a different time in the cycle. The seven measurements of pressure repeat themselves every sixty degrees of shaft rotation. The average pressure over a sixty degree rotation can be correlated to the average torque over the same time frame.

Zero Position Sensing Arrangement

The reference to a zero point is essential in some applications. For example, a motor that starts with a zero position, moves a number of different times, and then returns to the same zero position, needs to have a locator for that zero position. The sensor 11 is an absolute displacement sensor which produces an output signal which has a unique feature obtainable once and only once per revolution.

Because the signal output from the strain gage repeats itself for every lobe on the rotor, the absolute position can not be obtained through the analysis of the output signal due to signal repetition every 60 degrees of rotation when the pressure plate 12 (FIG. 3) has seven port holes. To provide a zero reference signal, a lobe on the rotor 15 was altered to produce a unique event in the output signal once and only once every revolution.

Figure 10:
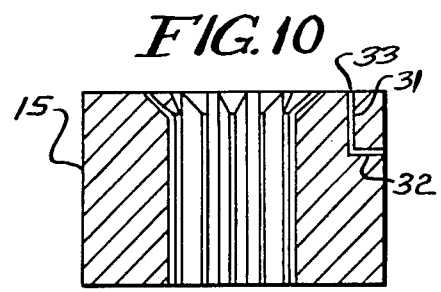
FIG. 10 is a sectional view of the rotor illustrating the hole porting arrangement for zero position detection in accordance with the present invention.

Referring to FIG. 10, a 0.79 mm hole 31 was drilled in the top of the rotor 15 to a depth of approximately 7 mm. A 0.79 mm hole 32 was then drilled in from the side of the rotor to meet the hole from the top defining a passageway 33.

The passageway 33 is used to port oil pressure from the side of the rotor 15 to the top of the rotor. The only oil flow through the hole is oil compressed into the sensor cavity due to the change from low pressure to high pressure and leakage. This amount of oil is so small that it can be neglected, and there is essentially no pressure drop through the passageway since very little oil flows through. The passageway 33 makes the pressure at the top of the rotor dependent on the pressure at which ever lobe on the rotor housing 16 to which the side hole 32 is adjacent. The zero position hole 25h in the pressure plate 12 (FIG. 3) is aligned with the hole 31 in the top of the rotor when that lobe traveled past it. Each time the two holes 25h and 31 become aligned, the pressure of the lobe is sensed by the strain gage sensor.

The dotted line in FIG. 3 shows the path taken by the rotor hole 31 during a complete revolution of the output shaft. The sensor used one strain gage dedicated to produce a zero position signal. The hole 31 in the rotor passes the slot 25h' in the pressure plate to sense the pressure in the lobe while it is in transition from high pressure state to low pressure state.

Figure 11:
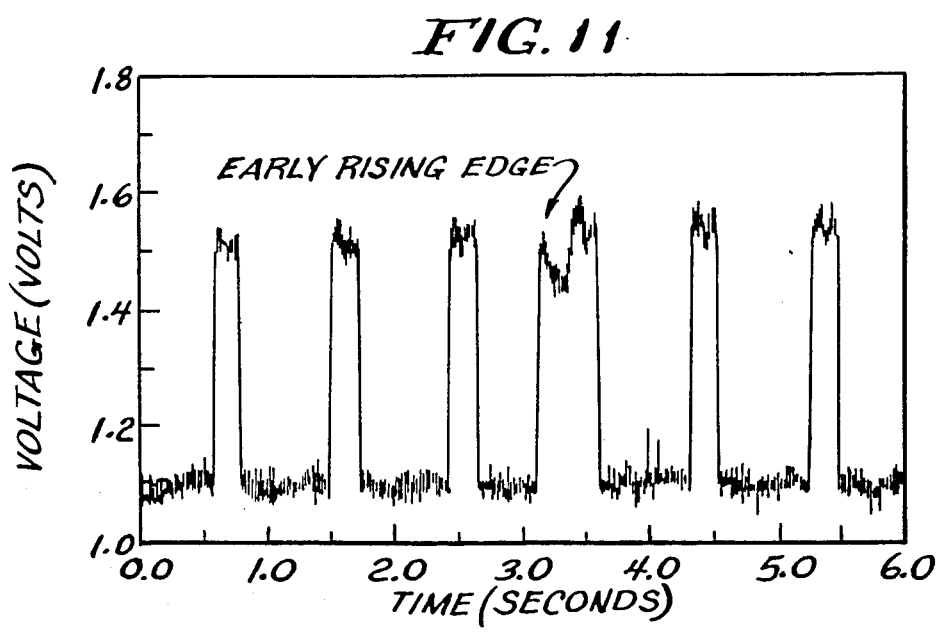
FIG. 11 is a graph of pressure pulses illustrating the output from a first zero position locator.

The resultant output signal is shown in FIG. 11. The signal is at a high pressure for a small period of time and at low pressure for a longer period of time. Actually, the sensor output is produced for only half of the sixty degree period. In the other half of the period, the sensor was blocked off from the lobe by the rotor, the pressure maintained at the sensor corresponding to the pressure at the time that the rotor moved into position to block the port hole 25h.

The zero position signal is produced when the hole 31 in the rotor 15 aligns with the port hole 25h in the pressure plate 12. At this instant, the hole 31 in the rotor 15 is at a high pressure state and thus the output signal becomes high pressure and stays high with continued rotation of the rotor to cover the port hole 25h again. The output signal changes from a low pressure state to a high pressure state earlier in only one of the six 60 degree rotations as indicated in FIG. 11 at 3.1 seconds.

Figure 15:
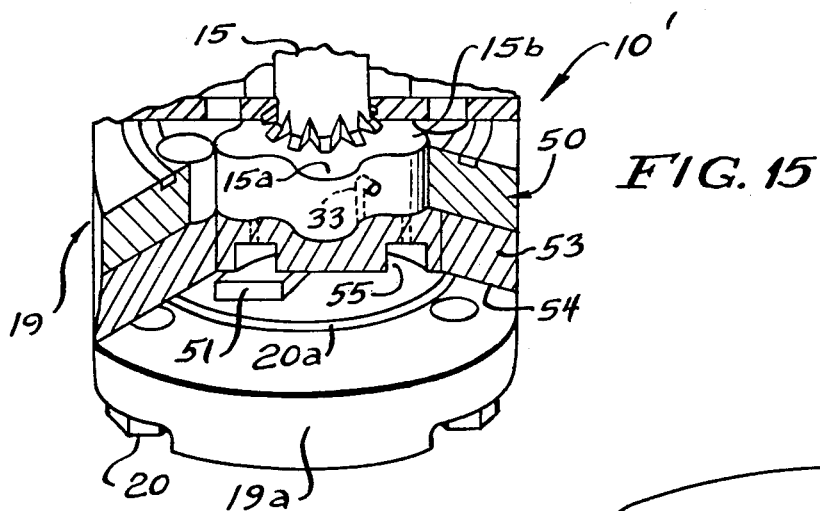
FIG. 15 is a fragmentary perspective view, partially in section, of an hydraulic motor incorporating a single plate rotational displacement sensor provided by the invention.
Figure 16:
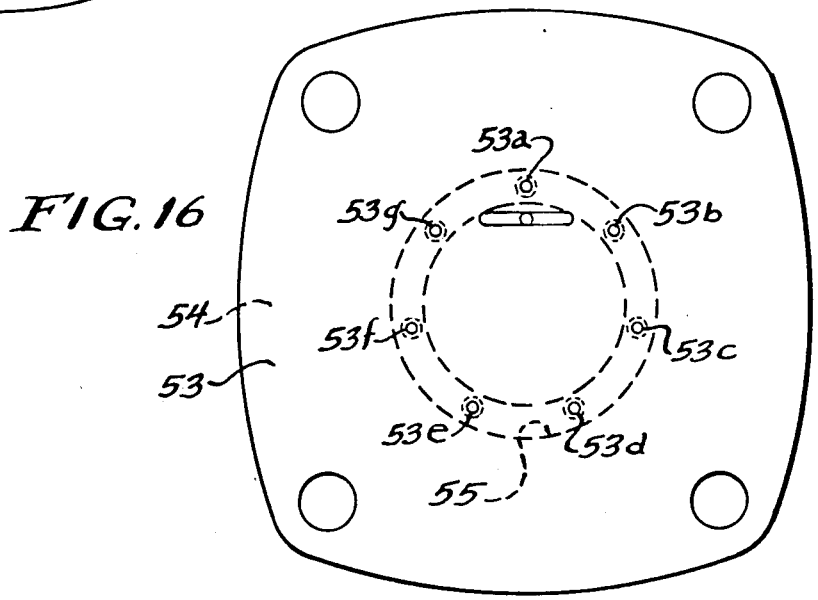
FIG. 16 is a plan view of the pressure plate for the single plate sensor.
Figure 13:
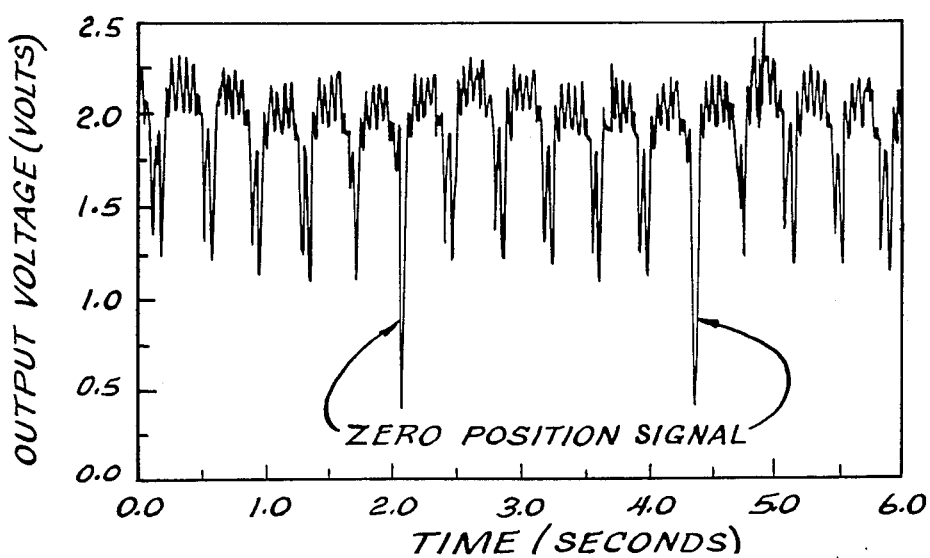
FIGS. 13 and 14 illustrate graphs of pressure for zero position outputs for different port values.

In another sensor embodiment shown in FIGS. 15 and 16, the passageway 33' in the rotor is formed through the rotor between two adjacent lobes rather than on the end of one of the lobes. In this embodiment, a unique occurrence happens every revolution. The sensor signal has only one high to low transition per revolution as illustrated in FIG. 13, and the zero position signal for each revolution easily be determined by detecting the change of state.

Instrumentation

The test arrangement and test apparatus was similar to that as described in the referenced Krutz et al application. Referring to FIG. 7, the signal from the two diaphragm strain gages were conditioned using two Daytronic 3170 Strain Gage Conditioners only one of which is shown. The Daytronic conditioners provided the gages with excitation, had adjustments for the balance and span, and had a built in low pass filter. The excitation was set at 5 volts. The balance was used to adjust the bridge at no load. The span was adjusted on each amplifier to set the output gain. The gain on the zero position gage amplifier was set to 2225, while the gain on the incremental gage amplifier was set to 750. The conditioners were connected to produce an analog output of dc and ac from 0 to 200 Hz. The output was collected, analyzed and stored using a VAX 11/780 computer. The data acquisition system of the VAX computer used an analog to digital converter (ADC) 45 having a resolution of 0.0049 volts.

Torque was measured using a Lebow strain gage shaft torque sensor. The torque transducer had a rated capacity of 1,130 N-m and a maximum speed of 4,000 rpm. A Daytronic 3270 Strain Gage Conditioner was used to provide the transducer with an input excitation, amplification and filtering. The transducer was excited with 10 volts. The gain of the conditioner was approximately 189, and the signal was an analog output of dc and ac from 0 to 2 Hz. A linear regression method was used to fit a calibration curve to the data points of torque giving a R value of 0.9998. The balance and span adjustments were made to balance the gage while at zero torque and to provide a meaningful readout of torque on the LED Daytronic display. The torque was also collected using the VAX computer.

Speed was measured using an Airfax 4-0052 magnetic pick-up in conjunction with a 60 tooth gear wheel mounted on the torque transducer. The magnetic pick-up was powered by a Harrison 6200B DC Power Supply set to supply a constant 12 volt excitation to the pick-up. The speed was displayed to the nearest rpm on a Flow-tech model 1400 frequency counter. The counter used a time base of 1.0 seconds, thus the speed was updated every second. The speed measurement had an absolute uncertainty of one rpm.

Flow through the test motor was measured using a Flow-tech FS1000 turbine block. The flow was displayed to the nearest 0.1 gallon per minute (gpm) using a time base of 0.5155 seconds on the Flow-tech frequency counter.

Test Procedure

Referring to FIG. 7, the sensor was tested using the following test procedure. First, all of the instrumentation was turned on to allow it to warm up and become balanced (about five minutes). Also cooling water was run through a heat exchanger on the hydraulic pump 37 which supplied the test motor with oil to minimize drifting of the strain gage signal due to the operational temperature which affects the strain gage adhesive. The 6.7 kW pump was then turned on and flow was diverted over the flow control valve 39 for approximtely five minutes to allow the oil to warm up to an equilibrium temperature. The speed of the motor was then adjusted using the friction brake 42. The friction brake was adjusted to produce the desired torque.

The analog output of the sensor was observed with a Tektronics oscilloscope. This permitted for span adjustments of the strain gage amplifier so the amplification needed was large enough for the signal not to be affected by the resolution of the A/D converter.

The output of the strain gage amplifier was then disconnected from the oscilloscope and connected to the data acquisition lines of a VAX 11/780 computer. The data was sampled at approximately 300 samples of each channel per second, for 10 seconds. A Hewlett Packard plotter was then used for plotting the data for visual analysis.

Rotational Displacement Results

The rotational displacement sensor was tested over a torque range of 2.7 to 93.5 N-m and a speed range of 2.0 to 50.0 rpm. The test at 2 and 4.5 rpm resulted in stalling which limited the testing to below 53.4 N-m at 4.5 rpm and to below 26.7 N-m at 2.0 rpm. The friction brake was used to provide a constant load during testing.

Figure 12:
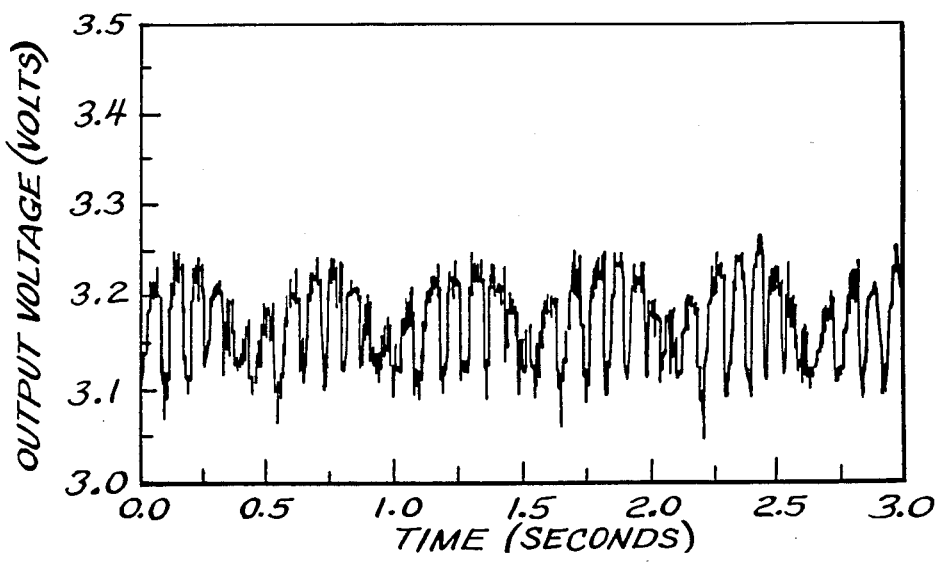
FIG. 12 illustrates a graph of pressure at a selected gage output and port value.

FIG. 12 is a graph of the sensor output at 18.0 rpm and 2.7 N-m. However, it has been determined that the signal is distinct over the speed range of 2.0 to 50.0 rpm and torque range of 2.7 to 93.5 N-m. The signal is an approximate square wave, with two pressure states, superimposed on a sine wave. The period of the square wave or high frequency signal is 8.57 degrees of rotation. This was calculated knowing the porting arrangement in the motor. It can also be calculated using the output signal and knowing the speed of the motor. The period of the sine wave or low frequency signal is 60 degrees of rotation.

FIG. 12 presents data taken at 18 rpm and a low torque of 2.7 N-m. Approximately 330 degrees of rotation are presented. The signal has some places where the two pressure states are difficult to distinguish but the signal does not change, even at low torque.

Zero Location Results

FIG. 13 is a graph showing the output of the zero position gage for a speed of 27 rpm and torque of 93.5 N-m. The signal shows moderate pressure drops every 60 degrees and extreme pressure drops every 360 degrees. The signal can be used as a zero reference for a motor rotor. The pressure drops which occurred every 60 degrees were caused by leakages between the hole in the pressure plate and a lobe in the housing. A hardened pressure plate or one with an O-ring seal would help reduce this unwanted signal through allowing less deflection of the pressure plate.

Figure 14:
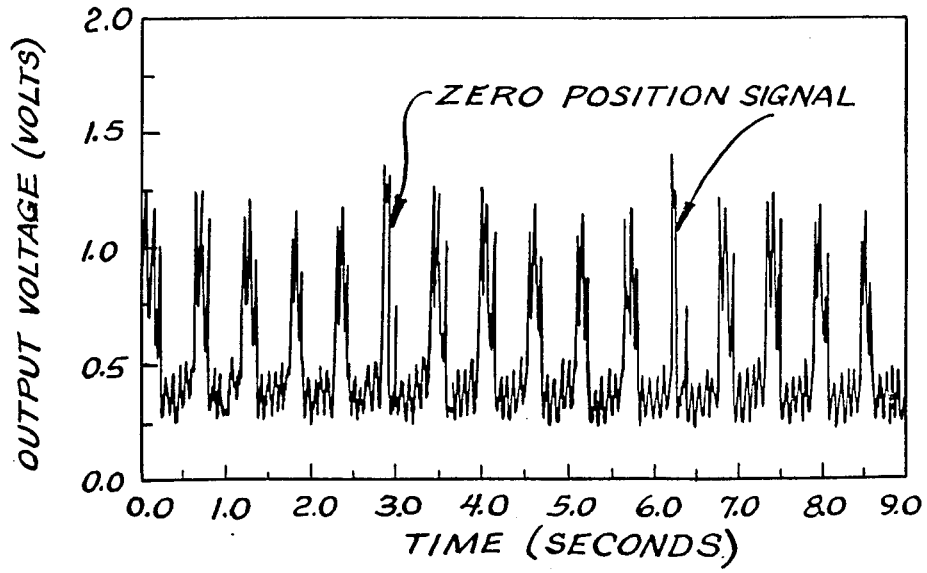

FIG. 14 is a graph of the output signal produced while the motor rotor was turning the opposite direction. The signal was taken for a speed of 18 rpm and 47 N-m torque. The zero position was not as distinct as for that obtained for clockwise rotation of the rotor, but has a higher peak and is shorter in duration than the peaks caused by leakages every 60 degrees.

When the motor rotor was turning in the clockwise direction, the bulk of the signal was at high pressure. In the counter-clockwise direction, the bulk of the signal was at low pressure. This difference was caused by the porting methods used for the sensor 11. When rotating clockwise, the center of the rotor was at high pressure, and a counter-clockwise rotation produced a low pressure at the center of the rotor. But, in both signals, a high pressure to low pressure transition exists and was used as the marker for zero location.

Single Plate Sensor

Referring to FIG. 15, there is shown a fragmentary perspective view, partially in section, of an hydraulic motor 10' including a single plate rotation displacement sensor 50 provided in accordance with the present invention. In this embodiment, pressure is sensed using a sensor which is readily adapted to be mounted on the end plate 19a of the hydraulic motor housing 19. By way of example, the sensor may be an integrated circuit sensor 51, such as the Sensym Type LX04 piezoresistive sensor or piezocapacitive sensor. Plate 53 serves as a combined pressure plate and port plate.

As shown in FIG. 16, the plate 53 includes seven port holes 53a–53g which are drilled in the plate 53 on a 37.69 mm diameter circle. Adjacent holes are spaced 51.43 degrees apart. Each of the holes has a diameter of 0.40 mm. Two of the holes contribute to the signal at any given time. The remaining holes are blocked off by the rotor as it rotates, each hole contributing to the signal at a different time during a 60 degree rotation. On the surface 54 of the plate 53 which is adjacent to the end plate 19a of the motor 10', there is formed a channel 55 interconnecting the seven port holes 53a–53g. A zero sensing hole 53h of a 0.4 mm diameter is drilled through the plate 53 adjacent to port hole 53a and communicated with the channel 55. The rotor 15 of motor 10' is provided with a passageweay 33' between a pair of lobes 15a, 15b or passageway 33 formed in the tip of one lobe 15a (FIG. 1) in a manner described above with reference to the motor 10 shown in FIG. 1 for zero position sensing.

The sensor 50 provides a composite output signal similar to that shown in FIG. 13 which indicates both incremental positions and zero position for each 60 degree rotation of the rotor 15.

Control System

Figure 17:
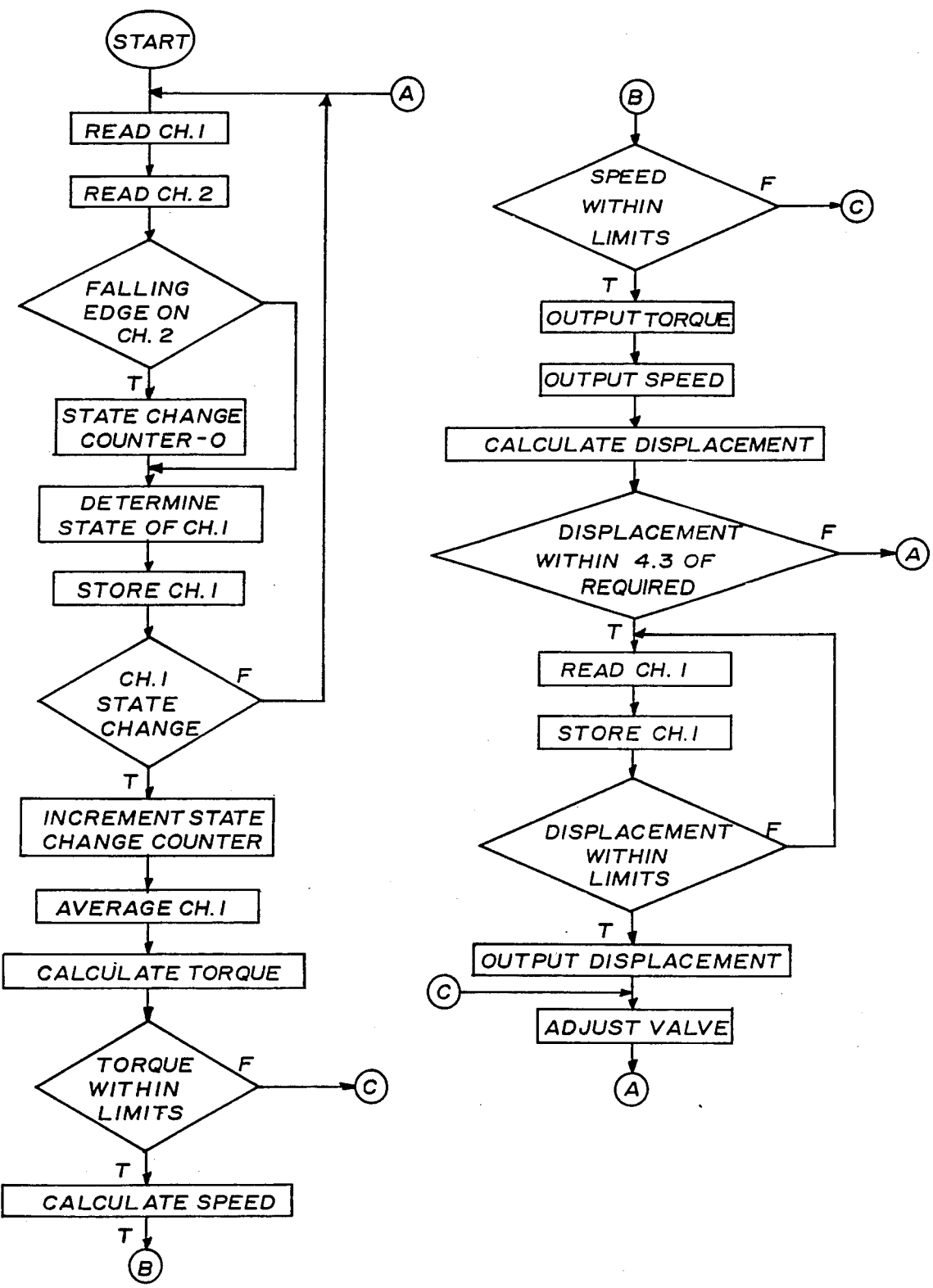
FIG. 17 is a process flow chart for controlling a motor in accordance with outputs of the pressure displacement sensor provided by the present invention.

A process flowchart for a feedback control system for controlling a motor using the sensor output is given in FIG. 17. The speed or torque of the motor may, for example, be controlled by opening or closing a valve through fluid is supplied to the motor for driving the motor. In the process for a two gage sensor such as the sensor 11 for motor 10 shown in FIG. 1, signals in two channels are used as inputs. A first signal channel 1 is the output from the strain gage sensing incremental changes in rotation of the motor rotor. The other signal channel 2 is the output from the strain gage sensing the zero position for the motor rotor. The latter signal has a high voltage to low voltage transition only once per revolution. A similar process could be used for a single gage type sensor.

Improved accuracy in the feedback control system is obtained by using the speed and acceleration to calculate the rotational distance since the last change of voltage states. The displacement can be calculated as follows:

$$D = D_n + \frac{D_n - D_{n-1}}{T_n - T_{n-1}} (T - T_n) + \frac{V_n - V_{n-1}}{T_n - T_{n-2}} (T - T_n)^2$$

D = Current displacement
$D_n$ = Displacement at last state change,
$D_{n-1}$ = Displacement at state change n−1,
T = Current time,
$T_n$ = Time at last state change,
$T_{n-1}$ = Time at state change n−1.

$$V_n = \frac{D_n - D_{n-1}}{T_n - T_{n-1}} =$$

velocity between state changes n − 1 and n − 2, $$V_{n-1} = \frac{D_{n-1} - D_{n-2}}{T_{n-1} - T_{n-2}} =$$

velocity between state changes n − 1 and n − 2, $D_{n-1}$ = Displacement at state change n−2,
$T_{n-2}$ = Time at state change n−2.

The torque of the motor is calculated from voltage readings averaged over sixty degrees of rotation. The sixty degrees of rotation is easily distinguished by using fourteen state changes. Therefore the average torque over sixty degrees of rotation can be updated every state change.

The speed of the motor is calculated for 60 degrees of rotation by reading a real time clock every state change. The time required for 60 degrees rotation is converted into a speed. Some microcontrollers have the ability to read a real time clock. On others, the number of instructions in the program loop can be used to produce the time increment. A smaller or larger rotational increment could be used to calculate speed. Sixty degrees was chosen to be consistant with the torque calculation.

The program checks for a falling edge for the signal present on signal channel 2, and a change of state on signal channel 1. If the signal present on signal channel 1 has not had a change of state, the two signal channels are read again. When a change of state for the signal present on signal channel 1 occurs, the state change counter is incremented to indicate how many state changes have occurred since the negative transition of the signal present on signal channel 2. The signal can now be averaged over the last fourteen state changes and correlated to torque. The time over the last 14 state changes can be related to speed. When the displacement of the state change is within one state change of the required, the actual displacement can be calculated using the equation previously given. If the displacement is within the tolerance level of the required value, a signal can be sent to the valve to stop movement. Since the valve cannot close instantaneously, the valve could be gradually closed, depending on the distance from the required value.

What is claimed is:

1. Apparatus for determining a variety of operating parameters, including incremental rotational movement, speed and torque, of a fluid motor having a rotating assembly including a rotor and a rotor housing comprising: pressure sensing means and pressure coupling means interposed between said rotating assembly and said pressure sensing means for communicating to said pressure sensing means variations in pressure produced in a plurality of areas within the motor in response to rotation of the rotor within the rotor housing, said pressure sensing means producing a pressure signal indicative of the pressure variations, and said pressure coupling means including a plurality of apertures for selectively coupling pressure variations from at least two of said areas at a time to said pressure sensing means whereby the pressure signal produced by said pressure sensing means is defined by at least three states, permitting at least incremental movement of the rotor to be determined from the pressure signal.

2. Apparatus according to claim 1, wherein said pressure coupling means comprises at least one plate member having at least first and second apertures therein and located to overlie first and second chambers defined by the rotor and rotor housing, said plate member having channel means formed therein interconnecting said apertures, and said pressure sensing means communicating with said channel means.

3. Apparatus according to claim 2, wherein the rotor and rotor housing defines a given number of chambers and said plate member has said given number of apertures therein, each positioned to overlie a different one of the chambers.

4. Apparatus according to claim 2, wherein the rotor has a passageway formed therethrough between first and second surfaces thereof, said plate member has a further aperture therein located to communicate with said passageway once for each revolution of the rotor to communicate a rotor pressure to said pressure sensing means for modifying the pressure signal to indicate the reference position.

5. Apparatus according to claim 1 wherein said pressure sensing means is mounted on an end plate of the mqtor housing.

6. Apparatus according to claim 1, wherein said pressure coupling means comprises a pressure plate, a port plate and a sensor plate, said pressure plate having at least first and second apertures therein and located to overlie first and second chambers defined by the rotor and rotor housing, said port plate having at least first and second apertures aligned with said first and second apertures of said pressure plate and interconnected by a channel formed in said port plate, and said sensor plate including a pressure sensor located in communication with the channel in said port plate.

7. Apparatus according to claim 5, wherein said pressure sensor includes a diaphragm formed integrally with said port plate and a strain gage sensor secured to said port plate overlying said diaphragm.

8. The apparatus of claim 2, wherein the hydraulic motor comprises a roller stator hydraulic motor including a housing end plate positioned at an end of the motor housing and adjacent the chambers defined between the motor rotor and the roller stator.

9. Apparatus according to claim 1, wherein the operating parameter determined is motor torque.

10. Apparatus according to claim 1, wherein the operating parameter determined is motor speed.

11. Apparatus according to claim 1, wherein the operating parameter determined is rotational displacement of the rotor.

12. An apparatus for determining a variety of operating parameters, including incremental rotational movement, speed and torque, of a fluid motor having a rotor comprising: a deflectable region on the motor housing, the region deflecting in response to stress applied to the region in response to variations in pressure in a plurality of areas within the motor as the motor operates, sensing means for sensing the resulting strain on the region and producing a signal indicative of the occurrence and amount of the strain, and pressure coupling means including a plurality of apertures for selectively communicating variations in pressure from at least two of said areas at a time to vary the stress applied to the region to modify the signal to enable said sensing means to produce a signal defined by at least three states permitting at least incremental movement of the rotor to be determined from the signal.

13. A method for determining operating torque of a fluid motor having a rotor assembly including a rotor, comprising the steps of: sensing incremental changes in the rotation of the rotor relative to a reference position by generating a signal having a known number of state changes for a given angular rotation of the rotor, detecting each change in state of the signal until the known number of state changes has been detected, and averaging the amplitude of the signal over a time interval which elapses in detecting the known number of state changes.

14. The method according to claim 13, wherein generating the signal includes porting pressure from a plurality of chambers defined by the rotor assembly to a pressure sensor through at least two pressure points.

15. The method according to claim 13 which includes modifying the signal once each revolution of the rotor to indicate a reference position for the rotor.

16. A method for determining the operating speed of a fluid motor having a rotor assembly including a rotor comprising the steps of: sensing incremental changes in the rotation of the rotor relative to a reference position by generating a signal having a known number of state changes for a given angular rotation of the rotor, detecting each change in state of the signal until the known number of state changes has been detected, timing the interval of time which elapses in detecting the known number of state changes, and using the elapsed time to determine the speed of the motor.

17. The method of claim 16 comprising the further step of using the motor speed determined to determine rotation movement of the rotor.

18. The method according to claim 16, wherein generating the signal includes porting pressure from a plurality of chambers defined by the rotor assembly to a pressure sensor through at least two pressure ports, and modifying the signal once each revolution of the rotor to indicate a reference position for the rotor.

19. Apparatus for determining an operating parameter of a fluid motor having a rotor assembly including a rotor and a rotor housing comprising pressure sensing means and pressure coupling means interposed between said rotor assembly and said pressure sensing means for communicating to said pressure sensing means variations in pressure produced within the motor in response to rotation of the rotor within the rotor housing, said pressure sensing means producing a pressure signal indicative of the pressure variation, and said pressure coupling means including a plurality of apertures for selectively coupling pressure variations to said pressure sensing means whereby the pressure signal produced by said pressure sensing means is defined by at least three states, permitting at least incremental movement of the rotor to be determined from the pressure signal, one of said apertures of said pressure coupling means cooperating with the rotor to define a reference position for the rotor, the pressure signal produced by said pressure sensing means indicating each time the rotor passes through the reference position.

20. An apparatus for determining an operating parameter of a fluid motor having a rotor comprising: a deflectable region on the motor housing, the region deflecting in response to stress applied to the region in response to variations in pressure produced in a plurality of areas from within the motor as the motor operates, sensing means for sensing the resulting strain on the region and producing a signal indicative of the occurrence and amount of the strain, and pressure coupling means including a plurality of apertures for selectively communicating variations in pressure from at least two of said areas at a time to vary stress applied to the region to modify the signal to enable said sensing means to produce a signal defined by at least three states permitting at least incremental movement of the rotor to be determined from the signal, said coupling means constructed and arranged to cooperate with the rotor to communicate to said sensor means a stress variation indicative of an absolute position of the rotor.

21. Apparatus for determining a variety of operating parameters, including incremental rotational movement, speed and torque, of a fluid operated device having a rotating assembly including a rotating member, comprising: pressure sensing means and pressure coupling means interposed between said rotating member and said pressure sensing means for communicating to said pressure sensing means variations in pressure produced in a plurality of areas withint he fluid operated device in response to rotation of the rotating member, said pressure sensing means producing a pressure signal indicative of the pressure variations, and said pressure coupling means including a plurality of apertures disposed for selectively coupling pressure variations from at least two of said areas at a time to said pressure sensing means, whereby the pressure signal produced by said pressure sensing means is defined by at least three states, permitting at least incremental movement of the rotating member to be determined from the pressure signal.

22. Apparatus according to claim 21, wherein said plurality of apertures through said coupling means are located along a first path, and wherein said rotating member has a further plurality of apertures therein which traverse a second path as said rotating member rotates one of said paths being generally circular and the other one of said paths being eccentric.

* * * * *

UNITED STATES PATENT AND TRADEMARK OFFICE
CERTIFICATE OF CORRECTION

PATENT NO. : 4,679,488
DATED : July 14, 1987
INVENTOR(S) : Gary Krutz and David L. Hansen It is certified that error appears in the above-identified patent and that said Letters Patent is hereby corrected as shown below:

Column 4, line 32, "pressing" should be -- pressure --;

Column 5, line 50, "presure" should be -- pressure --;

line 62, "7.0 $cm^3$/rev." should be -- 7.0 $cm^3$/sec. --;

Column 6, line 12, "a" should be -- as --;

Column 10, line 50, "$D_{n-1}$" should be -- $D_{n-2}$ --;

Column 14, line 19, "withint he" should be -- within the --;

line 37, insert a comma after "rotates".

Signed and Sealed this

Twenty-fourth Day of July, 1990

Attest:

HARRY F. MANBECK, JR.

*Attesting Officer*  *Commissioner of Patents and Trademarks*